US010208878B2

(12) United States Patent
Kobayashi et al.

(10) Patent No.: US 10,208,878 B2
(45) Date of Patent: Feb. 19, 2019

(54) JOINED BODY AND METHOD FOR PRODUCING JOINED BODY

(71) Applicant: NGK INSULATORS, LTD., Nagoya (JP)

(72) Inventors: Yoshimasa Kobayashi, Nagoya (JP); Kisuke Yamamoto, Yokkaichi (JP); Yunie Izumi, Nisshin (JP); Takashi Noro, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 136 days.

(21) Appl. No.: 15/465,659

(22) Filed: Mar. 22, 2017

(65) Prior Publication Data

US 2017/0276280 A1     Sep. 28, 2017

(30) Foreign Application Priority Data

Mar. 23, 2016     (JP) .................................. 2016-058297

(51) Int. Cl.
*C04B 37/00*     (2006.01)
*F16L 41/02*     (2006.01)
*C04B 37/02*     (2006.01)

(52) U.S. Cl.
CPC ............ *F16L 41/02* (2013.01); *C04B 37/025* (2013.01); *C04B 37/026* (2013.01); *C04B 2237/062* (2013.01); *C04B 2237/064* (2013.01); *C04B 2237/122* (2013.01); *C04B 2237/123* (2013.01); *C04B 2237/365* (2013.01); *C04B 2237/402* (2013.01); *C04B 2237/708* (2013.01); *C04B 2237/72* (2013.01)

(58) Field of Classification Search
CPC ............ C04B 37/026; C04B 2237/062; C04B 2237/064; C04B 2237/72; C04B 2237/122; C04B 2237/123; C04B 2237/365; C04B 2237/405; Y10T 428/19; Y10T 428/24149
See application file for complete search history.

(56) References Cited

U.S. PATENT DOCUMENTS

2011/0065973 A1* 3/2011 Fernie .................. B23K 20/021
585/653

FOREIGN PATENT DOCUMENTS

JP      H03-037165 A      2/1991
JP      2011-230971 A    11/2011

* cited by examiner

*Primary Examiner* — Alexander S Thomas
(74) *Attorney, Agent, or Firm* — Burr & Brown, PLLC (57) ABSTRACT

A joined body 10 includes a ceramic body 12, a metal member 14, and a joint portion 15 that joins the ceramic body 12 and the metal member 14 together. The joint portion 15 includes a first joint layer 16 joined to the ceramic body 12 and a second joint layer 18 joined to the metal member 14. The first joint layer 16 is disposed on the ceramic body 12 side and contains an alloy that contains Fe and Cr as main components, and a compound having a thermal expansion coefficient of $4.0 \times 10^{-6}$ (/° C.) or lower is dispersed in the first joint layer 16. The second joint layer 18 is disposed on the metal member 14 side, contains an alloy that contains Fe and Cr as main components, and has a larger thermal expansion coefficient than the first joint layer 16.

20 Claims, 3 Drawing Sheets

JOINED BODY AND METHOD FOR PRODUCING JOINED BODY

BACKGROUND OF THE INVENTION

1. Field of the Invention

The present disclosure disclosed in the present specification relates to a joined body and to a method for producing the joined body.

2. Description of the Related Art

In one previously proposed joined body, a ceramic member and an active metal plate are joined together with a high-melting point brazing material, and the active metal plate, a metal member, and a metallic stress relaxation layer interposed therebetween are joined together with a low-melting point brazing material (see, for example, PTL 1). It is stated that, in this joined body, the metallic stress relaxation layer can reduce residual stress caused by the difference in thermal expansion between the ceramic member and the metal member. In another proposed joined body, a metal member and a ceramic body are joined together through a joint layer containing Si, Cr, and a metal element having a small thermal expansion coefficient (see, for example, PTL 2). It is stated that, in this joined body, thermal resistance, joint reliability, and ohmic contact can be ensured.

CITATION LIST

Patent Literature

[PTL 1] Japanese Unexamined Patent Application Publication No. 3-37165
[PTL 2] Japanese Unexamined Patent Application Publication No. 2011-230971

SUMMARY OF THE INVENTION

PTL 1 proposes that a metal such as Cu, Al, W, WC, or Mo is used as the stress relaxation layer interposed in the joined body. However, since the interposed metal has low thermal resistance (Cu and Al) or low oxidation resistance (Cu, Al, W, WC, and Mo), the joined body cannot be applied to members used at high temperature, e.g., at 600° C. or higher. PTL 2 states that the joined body has electric conductivity and that thermal stress can be relaxed. However, these are still not sufficient, and further improvements are needed.

The present disclosure has been made in view of the above problems, and it is a main object to provide a joined body that can have improved thermal reliability of the joint while having electric conductivity and to provide a method for producing the joined body.

The present inventors have conducted extensive studies to achieve the main object described above and found that, when the joint portion between the metal member and the ceramic body contains a low-expansion compound and an alloy that contains Fe and Cr as main components, a reduction in joint strength can be further suppressed while electric conductivity is ensured, and thus the present invention disclosed in the present specification has been completed.

A joined body disclosed in the present specification comprises:
a silicon carbide-based ceramic body;
a metal member; and
a joint portion that joins the ceramic body and the metal member together, the joint portion including a first joint layer and a second joint layer, the first joint layer being disposed on a ceramic body side, the first joint layer containing an alloy that contains Fe and Cr as main components and further containing a compound having a thermal expansion coefficient of $4.0 \times 10^{-6}$ (/° C.) or lower, the compound being dispersed in the first joint layer, the second joint layer being disposed on a metal member side, the second joint layer containing an alloy that contains Fe and Cr as main components, the second joint layer having a larger thermal expansion coefficient than the first joint layer.

The joined body production method disclosed in the present specification is a method for producing a joined body includes a silicon carbide-based ceramic body, a metal member, and a joint portion that joins the ceramic body and the metal member together and includes a first joint layer and a second joint layer,
the method comprises:
a stacking step of forming a first raw material on a ceramic body side, forming a second raw material on a metal member side, and stacking the ceramic body and the metal member one on another to obtain a stacked body, the first raw material becoming the first joint layer, the first raw material containing a compound having a thermal expansion coefficient of $4.0 \times 10^{-6}$ (/° C.) or lower and a metal that contains Fe and Cr as main components, the second raw material becoming the second joint layer that has a larger thermal expansion coefficient than the first joint layer, the second raw material containing a metal that contains Fe and Cr as main components; and
a heat treatment step of subjecting the stacked body to heat treatment in a vacuum or an inert atmosphere in a temperature range of from 1,000° C. to 1,300° C.

In the joined body and the joined body production method disclosed in the present specification, the thermal reliability of the joint can be further improved while electric conductivity is ensured. The reason for this may be as follows. For example, since the joint portion contains the alloy containing Fe and Cr as main components, the joint portion is thermally stable and has electric conductivity. The joint portion contains, on at least the ceramic body side, the compound having a low thermal expansion coefficient, and the thermal expansion coefficient on the metal member side is high. This allows the thermal expansion/contraction stress in the joint portion to be more relaxed, so that a reduction in the thermal reliability of the joint, i.e., a reduction in bondability when a thermal load is applied, can be further suppressed.

DETAILED DESCRIPTION OF THE INVENTION

The joined body disclosed in the present specification includes a ceramic body, a metal member, and a joint portion that joins the ceramic body and the metal member together. This joined body may be used, for example, to conduct electric power supplied from the metal member to the ceramic body.

The ceramic body is silicon carbide-based and may, for example, have electric conductivity. The ceramic body may be a porous body or a dense body. The ceramic body may have a porosity, for example, within the range of from 0% by volume to 65% by volume. When the ceramic body is porous, the porosity may be, for example, within the range of from 25% by volume to 70% by volume and within the range of from 30% by volume to 65% by volume. The porous ceramic body may be Si-bonded SiC ceramic containing SiC and metal Si that bonds the SiC. The Si-bonded SiC ceramic has electric conductivity. Therefore, for example, a metal member used as an electrode may be joined to the Si-bonded SiC ceramic in some cases, and the significance of the application of the present disclosure is high. The Si-bonded SiC ceramic may contain metal Si in an amount within the range of from 15% by mass to 60% by mass.

When the ceramic body is dense, its porosity may be 5% by volume or less, preferably 1% by volume or less, and more preferably 0.5% by volume or less. The dense ceramic body may be, for example, a dense sintered body or a member prepared by filing pores of a porous ceramic body with a filler, an impregnant, etc. One specific example of the filled member is a Si-impregnated SiC sintered body preparing by impregnating pores of porous SiC with metal Si. This material has high thermal conductivity, and the metal Si provides high electric conductivity. It is preferable that a joint surface of the dense ceramic body on which the joint portion is formed has a surface roughness Ra of preferably 2 μm or more. A surface roughness Ra of 2 μm or more allows easy entrance of raw material particles of the joint portion, and therefore the joint strength can be increased. The surface roughness Ra is preferably 10 μm or less, but this depends on the particle diameter of the raw material of the joint portion. The surface roughness Ra is referred to also as arithmetic mean roughness and is surface roughness determined according to JIS-B0601.

No particular limitation is imposed on the shape of the ceramic body, and the shape of the ceramic body can be selected according to its application. Examples of the shape of the ceramic body include a plate shape, a cylindrical shape, and a honeycomb shape, and any shape that allow a fluid to flow therethrough may be used. The ceramic body may be, for example, a honeycomb structure including a partition portion that forms a plurality of cells serving as passages of a fluid.

No particular limitation is imposed on the metal member, so long as it is formed of a metal such as a main-group metal or a transition metal. For example, preferably, the metal member has high electric conductivity. The metal member is preferably a transition metal such as Fe, Co, Ni, or Cu or an alloy. In some applications, a noble metal such as Pt or Au may be used. The metal member may be an electrode. In this case, stainless steel such as a Cr—Ni—Fe-based alloy (SUS304) or a Cr—Fe-based alloy (SUS430) is preferably used. Preferably, the metal member is an alloy containing at least Fe and Cr. It is more preferable that the metal member is an alloy containing at least Fe in an amount of 70% by mass or more and less than 90% by mass and Cr in an amount of 10% by mass or more and less than 30% by mass. This is because the above materials are stable and have preferable electric conductivity. The shape of the metal member may be, for example, a plate shape and is appropriately selected according to the application of the metal member.

The joint portion includes a first joint layer and a second joint layer. The first joint layer is a layer which is disposed on the ceramic body side and contains an alloy that contains Fe and Cr as main components and in which a compound having a thermal expansion coefficient of $4.0 \times 10^{-6}$ (/° C.) or lower (referred to also as a low-thermal expansion compound) is dispersed. The second joint layer is a layer disposed on the metal member side, containing an alloy that contains Fe and Cr as main components, and having a thermal expansion coefficient larger than the first joint layer. The low-thermal expansion compound may be any material with a thermal expansion coefficient of $4.0 \times 10^{-6}$ (/° C.) or lower, and the thermal expansion coefficient may be $3.0 \times 10^{-6}$ (/° C.) or lower and $2.0 \times 10^{-6}$ (/° C.) or lower. This compound may be a material with a thermal expansion coefficient of $0.5 \times 10^{-6}$ (/° C.) or more. No particular limitation is imposed on the low-thermal expansion compound so long as it is chemically stable in the joint portion. Preferably, the low-thermal expansion compound is, for example, at least one of cordierite and spodumene. One of them may be contained in the joint portion, or a plurality of them may be contained in the joint portion. The overall thickness of the joint portion may be within the range of from 90 μm to 700 μm.

The joint portion may contain an alloy in which the mass ratio of Fe to Cr is within the range of 82/18 to 70/30. Specifically, the amount of Cr relative to the total amount of metal components (Fe, Cr, and Ni) contained in the joint portion is preferably from 18% by mass to 30% by mass. The amount of Fe relative to the total amount of the metal components contained in the joint portion is preferably from 70% by mass to 82% by mass. The amount of Cr is preferably 18% by mass or more because increased oxidation resistance is obtained. A large amount of Cr causes difficulty in sintering. However, when the amount of Cr is 30% by mass or less, improved sinterability can be obtained. Preferably, the joint portion includes an alloy having a Ni content of from 0% by mass to 8% by mass with the total amount of Fe, Cr, and Ni (the total amount of the metal components) set to 100% by mass. When the Ni content is 8% by mass or less, a reduction in mechanical strength caused by the formation of reaction phases of Ni with SiC and/or Si can be further suppressed.

For example, the first joint layer may be joined directly to the ceramic body or may be joined to an electrode formed on the ceramic body. When the first joint layer is joined to the electrode, it is preferable in terms of bondability and thermal stress relaxation that the electrode is a member having a composition the same as or similar to that of the first joint layer. Preferably, the first joint layer contains the low-thermal expansion compound in an amount within the range of from 5% by volume to 40% by volume with the total volume of the metal components and the low-thermal expansion compound set to 100% by volume. The amount of this compound is preferably 5% by volume or more because the stress caused by thermal expansion can be relaxed. The amount of the compound is preferably 40% by volume or less because the electrical resistance can be further reduced (the electric conductivity can be further increased). Preferably, the first joint layer has a thickness within the range of from 10 μm to 200 μm. The thickness is preferably 10 μm or more because the electric conductivity can be ensured stably. The thickness is preferably 200 μm or less because, when the joined body is used as, for example, an electrode of a heater, its heat capacity can be reduced and good heating characteristics can be achieved.

The second joint layer may be joined, for example, directly to the metal member. The second joint layer is a layer having a larger thermal expansion coefficient than the first joint layer and may contain a low-thermal expansion compound in an amount within the range of from 0% by volume to 20% by volume. In this case, the amount of the low-thermal expansion compound contained in the second joint layer is lower than that in the first joint layer. The low-thermal expansion compound contained in the second joint layer may be the same as or different from the compound contained in the first joint layer but is more preferably the same as the compound contained in the first joint layer. The second joint layer has a thickness within the range of preferably from 80 μm to 500 μm. The thickness is preferably 80 μm or more because the thermal stress caused by the difference in thermal expansion between the ceramic body and the metal member can be relaxed. The thickness is preferably 500 μm or less because, when the joined body is used as, for example, an electrode of a heater, its heat capacity can be reduced and good heating characteristics can be achieved.

In this joined body, the ceramic body has a volume resistivity of preferably from 0.05 Ωcm to 200 Ωcm, and the joint portion has a volume resistivity of preferably from 0.0001 Ωcm to 0.1 Ωcm. The joined body may be used for, for example, a heater. In this case, when the volume resistivity of the ceramic body is 0.05 Ωcm or more, a low-voltage power source of 12 V can be used for heating. When the joined body is used for, for example, a heater and the volume resistivity of the ceramic body is 200 Ωcm or less, a high-voltage power source of several hundreds of V can be used for heating. When the volume resistivity of the joint portion is 0.0001 Ωcm or more, the joint portion can have a uniform in-plane current distribution, and the supply of current from the metal member to the ceramic body can be uniform over the entire joint portion. When the volume resistivity of the joint portion is 0.1 Ωcm or less, heat generation of the joint portion can be reduced. Therefore, power saving can be achieved, and problems caused by the heat generation can be prevented.

In the joined body, the joint strength between the ceramic body and the metal member is preferably 1.5 MPa or more. The joint strength is measured by a tensile test (according to JIS R 1606). The joint strength is more preferably 3.0 MPa or more and still more preferably 5.0 MPa or more. The higher the joint strength, the more preferred because the joint is stronger and the reliability is improved. The adhesion strength between the ceramic body and the joint portion and the adhesion strength between the metal member and the joint portion may be at least equal to or higher than the joint strength between the ceramic body and the metal member.

No particular limitation is imposed on the joined body so long as it has a structure in which the ceramic body and the metal member are joined together, and the joined body can be used for, for example, honeycomb structures, thermionic elements, ceramic heaters, gas detection sensors for oxygen and NOx, and fuel cells. For example, the joined body is preferably used for a honeycomb structure. Specifically, a voltage is applied to the metal member to heat the honeycomb structure.

Figure 1:
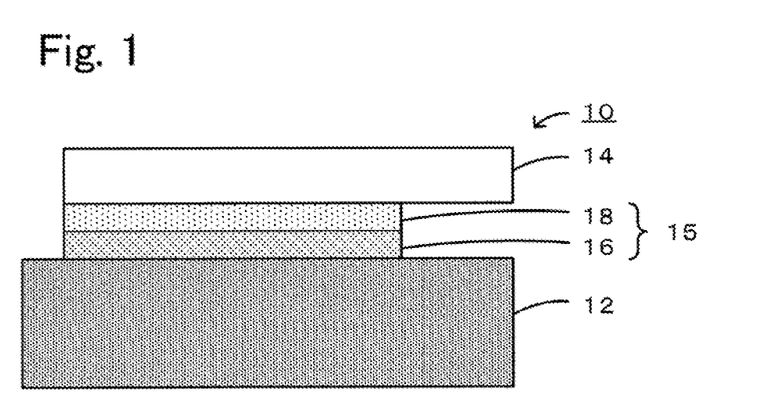
FIG. 1 is an illustration showing an example of the schematic structure of a joined body 10.
Figure 2:
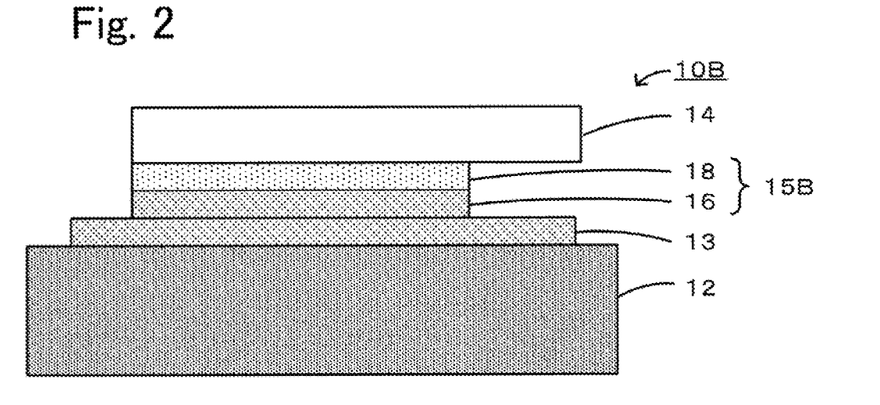
FIG. 2 is an illustration showing an example of the schematic structure of a joined body 10B.
Figure 3:
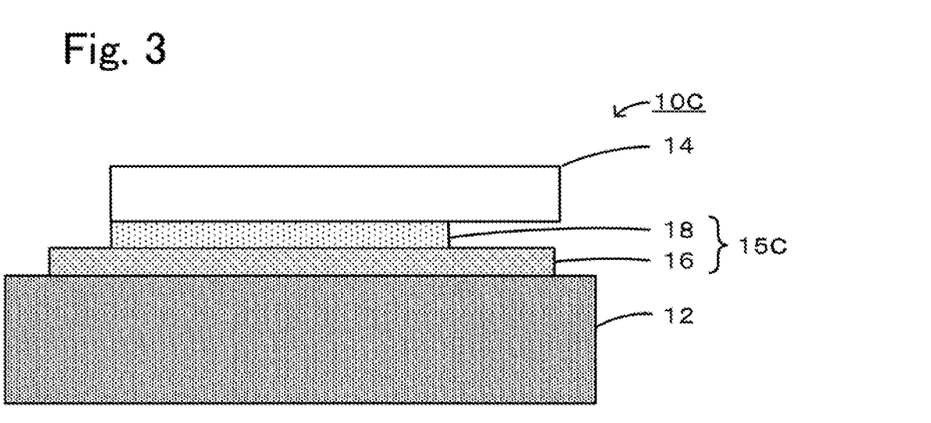
FIG. 3 is an illustration showing an example of the schematic structure of a joined body 10C.
Figure 4:
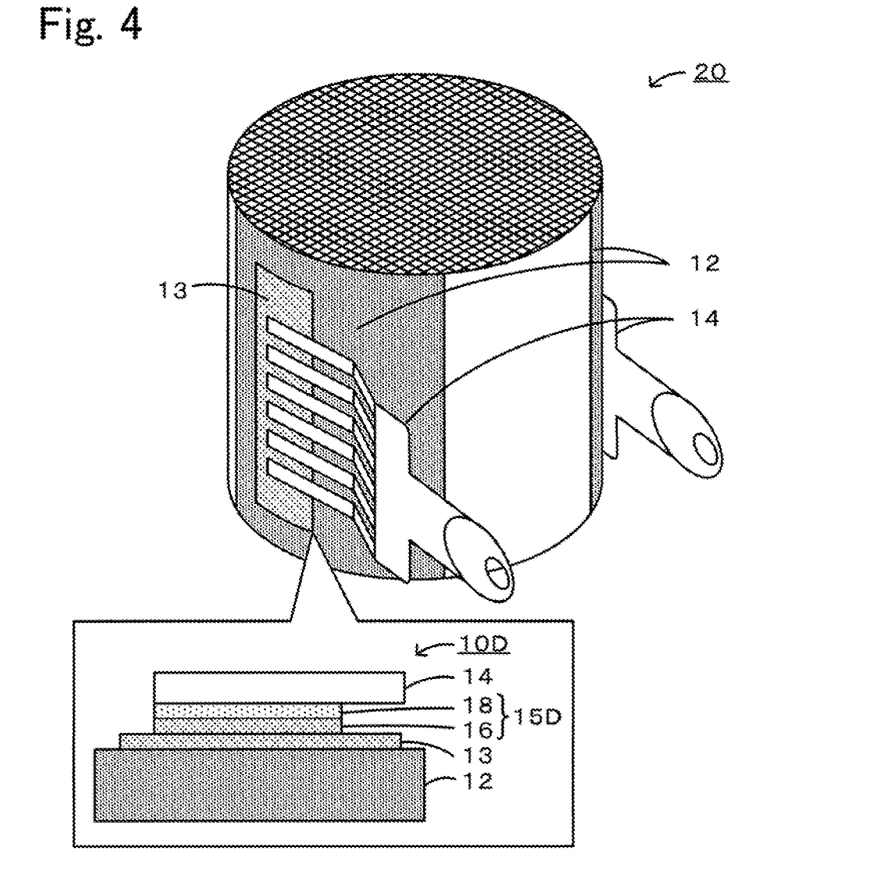
FIG. 4 is an illustration of a honeycomb structure 20 including a joined body 10D.

Next, specific examples of the joined body disclosed in the present specification will be described with reference to the drawings. FIGS. 1 to 4 are illustrations showing examples of the schematic structures of joined bodies 10 to 10D, which are embodiments. As shown in FIG. 1, the joined body 10 includes a ceramic body 12, a metal member 14, and a joint portion 15 that joins the ceramic body 12 and the metal member 14 together. The joint portion 15 includes a first joint layer 16 joined to the ceramic body 12 and a second joint layer 18 joined to the metal member 14. As shown in FIG. 2, the joined body 10B has a joint portion 15B including a first joint layer 16 joined to an electrode 13 formed on a ceramic body 12 and a second joint layer 18 joined to a metal member 14. The electrode 13 has, for example, a composition containing the same metal components and the same low-thermal expansion compound as those in the first joint layer 16. The electrode 13 may be formed on the ceramic body 12 so as to have a larger area than the first joint layer 16 and the second joint layer 18. As shown in FIG. 3, the joined body 10C has a joint portion 15C including a second joint layer 18 and a first joint layer 16 formed on a ceramic body 12 so as to have a larger area than the second joint layer 18. This first joint layer 16 may serve also as an electrode. The joined body 10D is prepared by joining a metal member 14 serving as a terminal to a ceramic body 12 serving as a base of a honeycomb structure 20. The honeycomb structure 20 includes a partition portion that forms a plurality of cells serving as flow passages of a fluid. The joined body 10D has the same structure as the joined body 10B but may have the same structure as the joined body 10 or the joined body 10C.

Next, a joined body production method according to an embodiment will be described. The joined body production method in the present embodiment may include, for example, a base producing step of producing a ceramic body, a stacking step of stacking the ceramic body and a metal member to obtain a stacked body, and a heat treatment step of subjecting the stacked body to heat treatment in a vacuum or an inert atmosphere in the temperature range of from 1,000° C. to 1,300° C. The ceramic body may be prepared separately, and the base producing step may be omitted.

(A) Base Producing Step

In this step, the ceramic body used as the base is produced. When the ceramic body is, for example, porous ceramic or dense ceramic, the base may be produced by mixing raw materials, molding the mixture into a compact by a prescribed molding method, and firing the compact. The ceramic body may be produced by molding, for example, silicon carbide. In this step, for example, silicon carbide used as an aggregate, a pore-forming material, and a dispersion medium may be mixed to prepare clay or slurry. When a Si-bonded SiC material is used for the base, silicon carbide used as an aggregate, metal Si used as a binder, a pore-forming material, and a dispersion medium may be mixed to prepare clay or slurry. In this case, it is preferable to prepare and mix the raw materials such that the porosity of the porous ceramic and its average pore diameter are within the above ranges, e.g., the porosity is within the range of 10% by volume or more and the average pore diameter is within the range of from 1 μm to 300 μm. In this step, the porous ceramic may be subjected to impregnation treatment in which the pores of the porous ceramic are impregnated with an impregnant such as metal Si. In this impregnation treatment, for example, an impregnation base may be formed on the porous ceramic, and the porous ceramic may be heated at temperature at which the impregnation base melts. When the porous ceramic is a Si-bonded SiC material, the impregnant may be metal Si.

When the ceramic body is a dense body, the method may include, before the stacking step, a surface treatment step of adjusting the surface roughness Ra of the joint surface of the ceramic body to 2 μm or more. In the dense ceramic body, its joint surface may be smooth, and therefore sufficient joint strength may not be obtained. In the surface treatment step, for example, the joint surface may be subjected to cutting to increase the surface roughness, or the surface may be etched to increase the surface roughness. Preferably, this treatment is performed such that the surface roughness Ra is 10 μm or less.

(2) Stacking Step

In the process performed in this step, the ceramic body and the metal member are stacked on one another. The ceramic body and the metal member may be any of the members described above. In the stacking step, a first raw material that becomes the first joint layer is formed on the ceramic body side. The first raw material contains, for example, a low-thermal expansion compound having a coefficient of $4.0 \times 10^{-6}$ (/° C.) or lower and a metal that contains Fe and Cr as main components. A second raw material that becomes the second joint layer having a larger thermal expansion coefficient than the first joint layer is formed on the metal member side. The second raw material contains a metal that contains Fe and Cr as main components. In the stacking step, no particular limitation is imposed on the low-thermal expansion compound so long as it is chemically stable in the joint portion. For example, at least one of cordierite and spodumene is preferably used. In this step, it is preferable that, in each of the first and second raw materials used, the mass ratio of Fe to Cr is within the range of 82/18 to 70/30. For example, it is preferable that each of the raw materials used contains Cr in an amount of from 18% by mass to 30% by mass with respect to the total mass of metal components. Preferably, the amount of Fe relative to the total amount of the metal components is from 70% by mass to 82% by mass. The amount of Cr is preferably 18% by mass or more because increased oxidation resistance is obtained. A large amount of Cr causes difficulty in sintering. However, when the amount of Cr is 30% by mass or less, improved sinterability can be obtained. Preferably, each of the first and second raw materials used contains Ni in an amount of from 0% by mass to 8% by mass with respect to the total mass of the metal components. When the Ni content is 8% by mass or less, a reduction in mechanical strength caused by the formation of reaction phases of Ni with SiC and/or Si can be further suppressed.

In the stacking step, it is preferable that the first raw material used contains the low-thermal expansion compound in an amount within the range of from 5% by volume to 40% by volume. The amount of this compound is preferably 5% by volume or more because the stress caused by thermal expansion can be relaxed. The amount of the compound is preferably 40% by volume or less because the electrical resistance can be further reduced (the electric conductivity can be further increased). Preferably, the first raw material is formed so as to have a thickness within the range of from 10 μm to 200 μm. The thickness is preferably 10 μm or more because the electric conductivity can be ensured stably. The thickness is preferably 200 μm or less because, when the joined body is used as, for example, an electrode of a heater, its heat capacity can be reduced and good heating characteristics can be achieved. In the stacking step, it is preferable that the second raw material used contains a low-thermal expansion compound in an amount within the range of from 0% by volume to 20% by volume. In this case, the amount of the low-thermal expansion compound contained in the second joint layer is lower than that in the first joint layer. The low-thermal expansion compound contained in the second joint layer may be the same as or different from the compound contained in the first joint layer but is more preferably the same as the compound contained in the first joint layer. Preferably, the second raw material is formed so as to have a thickness within the range of from 80 μm to 500 μm. The thickness is preferably 80 μm or more because the thermal stress caused by the difference in thermal expansion between the ceramic body and the metal member can be relaxed. The thickness is preferably 500 μm or less because, when the joined body is used as, for example, an electrode of a heater, its heat capacity can be reduced and good heating characteristics can be achieved.

In the stacking step, the metal that contains Fe and Cr as main components and is used in the second raw material may have a larger average particle diameter than the metal used in the first raw material. This is preferable because the bondability to the metal member can be improved and the thermal reliability of the joint can be further improved. The average particle diameter of the first raw material may be, for example, within the range of from 2 μm to 30 μm. The average particle diameter of the second raw material may be within the range of from 30 μm to 100 μm. Preferably, the first raw material used is, for example, a powder mixture of coarse particles (average particle diameter: 50 μm) and fine particles (average particle diameter: 10 μm). In this case, the coarse particles may have an average particle diameter within the range of from 30 μm to 100 μm, and the fine particles may have an average particle diameter within the range of from 2 μm to 30 μm. In the first raw material, the ratio, e.g., the volume ratio, of the coarse particles to the fine particles is within the range of preferably 0/10 to 6/4, more preferably 0/10 to 4/6, and still more preferably 0/10 to 3/7. In the second raw material, the ratio, e.g., the volume ratio, of the coarse particles to the fine particles is preferably within the range of 4/6 to 10/0 and preferably 7/3 to 10/0. If the amount of the coarse particles is large (the amount of the fine particles is small), the number of particles entering the pores is small, so that the bondability to the ceramic body deteriorates. If the amount of the coarse particles is small (the amount of the fine particles is large), sintering shrinkage becomes large, and the bondability to the metal member deteriorates. The average particle diameter of each raw material powder is a median diameter (D50) measured using a laser diffraction/scattering particle size distribution measurement device with water used as a dispersion medium.

Each of the raw materials of the joint portion may contain, in addition to the raw material metal powders and the low-thermal expansion compound powder, a binder, a solvent, a dispersant, a plasticizer, etc. and may be used in the form of, for example, slurry, paste, or clay. No particular limitation is imposed on the method for placing the first and second raw materials on the ceramic body and the metal member to produce the stacked body. For example, a coating method using slurries or pastes containing the raw material powders may be used to stack the ceramic body and the metal member with the coated surfaces interposed therebetween. Clay containing the raw material powders may be used to produce a compact by, for example, an extrusion molding method, and the compact may be disposed between the ceramic body and the metal member.

(3) Heat Treatment Step

In this step, the stacked body is subjected to heat treatment, and the metal powders form a joint portion composed of solid metal. In this step, the atmosphere during the heat treatment may be, for example, a vacuum or an inert atmosphere such as a nitrogen atmosphere or an argon atmosphere and is more preferably a vacuum. The temperature of the heat treatment may be set within an appropriate temperature range according to the materials of the joint portion and is within the temperature range of from 1,000° C. to 1,300° C. When the heat treatment temperature is 1,000° C. or higher, the strength of the joint portion can be further increased. When the heat treatment temperature is 1,300° C. or lower, energy consumption can be further reduced. The heat treatment temperature is preferably 1,100° C. or higher and more preferably 1,200° C. or lower. The heat treatment time is preferably 0.1 hours or longer and more preferably 0.5 hours or longer. The heat treatment time is preferably 24 hours or shorter, more preferably 10 hours or shorter, and still more preferably 2 hours or shorter.

In the joined body and the production method therefore in the present embodiment described above, the thermal reliability of the joint can be further improved while the electric conductivity is ensured. The reason for this may be as follows. For example, the joint portion is an alloy that contains Fe and Cr as main components, has electric conductivity, and has increased oxidation resistance. The low-thermal expansion compound is dispersed on the ceramic body side of the joint portion, and the thermal expansion coefficient on the ceramic body side is smaller than that on the metal member side. This may allow the thermal stress to be relaxed, and the joint reliability may thereby be improved.

The present disclosure is not limited to the above-described embodiment, and can be carried out by various modes as long as they belong to the technical scope of the disclosure.

Figure 5:
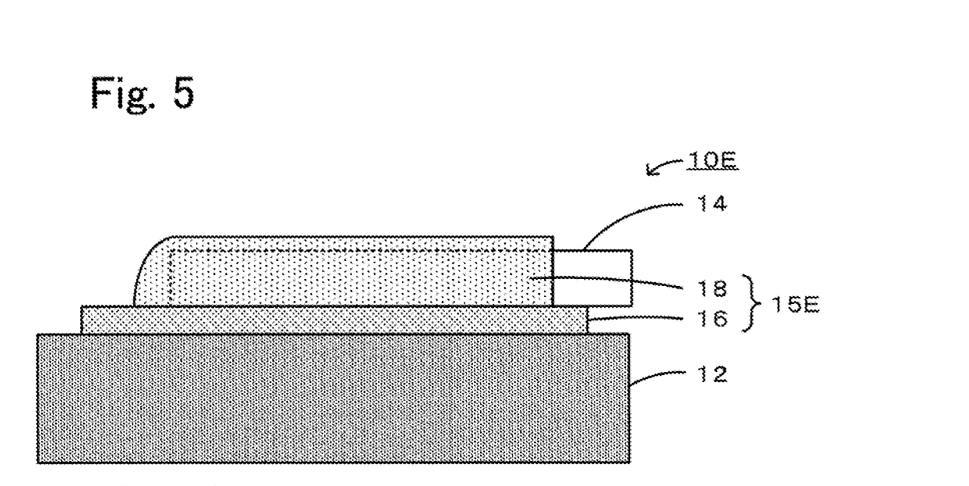
FIG. 5 is an illustration showing an example of the schematic structure of a joined body 10E.

In the above embodiments, the joint portion is formed between the ceramic body and the metal member, but this is not a specific limitation. For example, as shown in FIG. 5, the metal member 14 may be joined to the ceramic body 12 through a second joint layer 18 that covers, from above, the metal member 14 disposed on a first joint layer 16. FIG. 5 is an illustration showing an example of the schematic structure of a joined body 10E. Even in this case, the joined body obtained can have improved thermal reliability of the joint while the joint portion 15E has electric conductivity.

Figure 6:
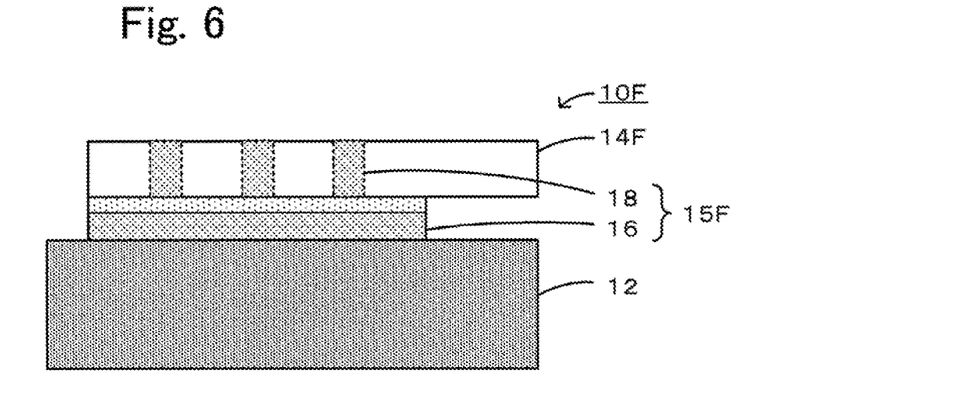
FIG. 6 is an illustration showing an example of the schematic structure of a joined body 10F.

In the embodiments described above, the metal member 14 used has a flat plate shape, but this is not a specific limitation. For example, as shown in FIG. 6, the metal member 14 may be a metal member 14F in which at least through holes, closed end holes, or grooved portions are formed at least on the joint surface side of the metal member 14. A structure with a joint portion 15F embedded in the through holes, the closed bottom holes, or the groove portions may be used. FIG. 6 is an illustration showing an example of the schematic structure of the joined body 10F. Even when the joined boy has the above structure, the joined body obtained has improved thermal reliability of the joint while the joint portion 15F has electric conductivity.

EXAMPLES

Hereinafter, exemplary joined bodies actually produced will be described as Examples. However, the present disclosure is not limited to the Examples. It will be appreciated that the present disclosure can be embodied in various forms so long as they fall within the technical scope of the disclosure.

Example 1

Cordierite used as the low-thermal expansion compound was mixed with a metal powder composed of Fe powder (82% by mass), Cr powder (18% by mass), and Ni powder (0% by mass) at a volume ratio of 5:95. The metal powder used was a powder mixture prepared by mixing coarse particles (average particle diameter: 50 μm) and fine particles (average particle diameter: 10 μm) such that the volume ratio of the coarse particles to the fine particles was 3/7. The cordierite used had a linear thermal expansion coefficient, defined by JIS R1618, of $2\times10^{-6}$/° C. at 40 to 800° C. α Terpineol used as a solvent and polyvinyl butyral (PVB) used as a binder were added to the powder mixture and mixed to prepare a paste. The paste prepared was printed on a Si-bonded SiC material (a porous ceramic body) such that the printed paste had a size of 10 mm×10 mm and a thickness of 100 μm to thereby form a raw material of the first joint layer. The Si-bonded SiC material used contained Si in an amount of 20% by mass and had a porosity of 40% by volume, a size of 30 mm×30 mm, and a thickness of 5 mm. Next, the coarse particles (average particle diameter: 50 μm) and the fine particles (average particle diameter 10 μm) were mixed such that the volume ratio of the coarse particles to the fine particles was 7/3 to thereby prepare a metal powder, and only this metal powder was used to prepare a paste. The paste was printed on a metal member (a Cr—Fe-based alloy, SUS430) such that the printed paste had a size of 10 mm×10 mm and a thickness of 100 μm to thereby form a raw material of the second joint layer. The metal member used had a size of 25 mm×25 mm and a thickness of 0.5 mm. The ceramic body and the metal member were stacked one on another with the upper surfaces of the pastes facing each other to thereby obtain a stacked body. An aluminum plate was pressed against the Si-bonded SiC material from above, and the resulting stacked body was dried in air at 80° C. for 4 hours and then sintered in a vacuum at 1,100° C. for 1 hour to thereby obtain a joined body in Example 1 in which the ceramic body and the metal member were joined together through the joint portion including the first joint layer and the second joint layer.

Examples 2 to 9

Joined bodies in Examples 2 to 9 each having a joint portion with a composition ratio shown in Table 1 were obtained. In each of the joined bodies, the amount of the low-expansion compound mixed was larger in the first joint layer than in the second joint layer (thermal expansion of the first joint layer was less than that of the second joint layer). In Example 8, a dense body in which pores of a ceramic body were filled with metal Si was used, and the surface roughness Ra (JIS B0601) of the joint surface of the ceramic body was adjusted to 2 μm by surface processing.

Examples 10 and 11

Joined bodies in Examples 10 and 11 were produced in the same manner as in Example 1. Each of the joined bodies had a composition ratio shown in Table 1, and spodumene (linear thermal expansion coefficient defined by JIS R1618 at 40 to 800° C.: $0.5\times10^{-6}$/° C.) was used as the low-thermal expansion compound.

Comparative Examples 1 to 6

Joined bodies having composition ratios shown in Table 1 were produced through the same steps as in Example 1. Specifically, in each of the joined bodies, the amounts of the metal components and the low-thermal expansion compound contained in the joint portion were changed. The produced joined bodies were used as Comparative Examples 1 to 6. In Comparative Example 5, the surface roughness Ra of the joint surface of the ceramic body used was adjusted to 0.5 μm.

Examples 12 to 16

Joined bodies having the same raw material composition as that in Example 3 were obtained through the same steps as in Example 3 except that, in each of the raw materials used, the volume ratio of the coarse particles to the fine particles was changed as shown in Table 2. The joined bodies obtained were used as Examples 12 to 16.

(Joint Reliability Test)

Each of the joined bodies produced was subjected to thermal cycles. Each cycle includes holding the joined body at 700° C. for 2 minutes and then holding it at room temperature (25° C.) for 2 minutes, and the thermal cycle was repeated 1,000 times (a thermal cycle test). Next, the resulting joined body was observed using a magnifying microscope, a metallurgical microscope, and an SEM to check separation of the joint portion and the occurrence of cracking in the joint portion and the ceramic body. The joint reliability of the joined body was evaluated as follows. The joint reliability was rated "A" when no separation of the joint portion or no cracking was found after the thermal cycle test and the rate of change in strength was maintained at 90% or higher, rated "B" when no separation of the joint portion or no cracking was found and the rate of change in strength was 70% or more and less than 90%, rated "C" when no separation of the joint portion or no cracking was found and the rate of change in strength was less than 70%, and rated "D" when separation or cracking was found.

(Electric Resistance Evaluation)

First, the electric resistance $R0$ of each joined body before the thermal cycle test was measured. Specifically, an Ag paste was used to form a 10 mm×10 mm electrode on a surface of the ceramic body on which the metal member was not attached, and the electrode and the metal member were connected to terminals of a measuring device to measure the electric resistance $R0$ of the joined body. Next, the electric resistance $R1$ of the joined body subjected to the thermal cycle test was measured using the same method as described above. Then the rate of change in resistance was computed using formula (1) below. The electric resistance was rated "A" when the rate of change in resistance was less than 103%, rated "B" when the rate of change in resistance was 103% or more and less than 105%, rated "C" when the rate of change in resistance was 105% or more and less than 200%, and rated "D" when the rate of change in resistance was 200% or more. $R1/R0 \times 100$ (formula 1)

TABLE 1

| | First joint layer (ceramic body side) | | | | | Second joint layer (meta member side) | | | | |
|---|---|---|---|---|---|---|---|---|---|---|
| | Metal component | | | Compound | | Metal component | | | Compound | |
| | Fe % by mass | Cr % by mass | Ni % by mass | Cordierite % by volume | Spodumene % by volume | Fe % by mass | Cr % by mass | Ni % by mass | Cordierite % by volume | Spodumene % by volume |
| Example 1 | 82 | 18 | 0 | 5 | 0 | 82 | 18 | 0 | 0 | 0 |
| Example 2 | 82 | 18 | 0 | 20 | 0 | 82 | 18 | 0 | 0 | 0 |
| Example 3 | 82 | 18 | 0 | 30 | 0 | 82 | 18 | 0 | 10 | 0 |
| Example 4 | 82 | 18 | 0 | 40 | 0 | 82 | 18 | 0 | 20 | 0 |
| Example 5 | 10 | 30 | 0 | 6 | 0 | 70 | 30 | 0 | 0 | 0 |
| Example 6 | 10 | 30 | 0 | 30 | 0 | 70 | 30 | 0 | 10 | 0 |
| Example 7 | 74 | 18 | 8 | 30 | 0 | 74 | 18 | 8 | 10 | 0 |
| Example 8 | 82 | 18 | 0 | 30 | 0 | 82 | 18 | 0 | 10 | 0 |
| Example 9 | 70 | 30 | 0 | 30 | 0 | 70 | 30 | 0 | 10 | 0 |
| Example 10 | 82 | 18 | 0 | 0 | 30 | 82 | 18 | 0 | 0 | 10 |
| Example 11 | 82 | 18 | 0 | 0 | 30 | 82 | 18 | 0 | 0 | 10 |
| Comparative example 1 | 50 | 50 | 0 | 40 | 0 | 50 | 50 | 0 | 10 | 0 |
| Comparative example 2 | 90 | 10 | 0 | 40 | 0 | 90 | 10 | 0 | 10 | 0 |
| Comparative example 3 | 82 | 18 | 0 | 0 | 0 | 82 | 18 | 0 | 0 | 0 |
| Comparative example 4 | 82 | 18 | 0 | 50 | 0 | 82 | 18 | 0 | 10 | 0 |
| Comparative example 5 | 82 | 18 | 0 | 30 | 0 | 82 | 18 | 0 | 10 | 0 |
| Comparative example 6 | 82 | 18 | 20 | 30 | 0 | 82 | 18 | 0 | 10 | 0 |

| | Ceramic body | | | Evaluation | |
|---|---|---|---|---|---|
| | Si content % by mass | Porosity % by volume | Surface roughness (Ra) (μm) | Joint reliability [1] | Electric resistance [2] |
| Example 1 | 20 | 40 | — | A | A |
| Example 2 | 20 | 40 | — | A | A |
| Example 3 | 20 | 40 | — | A | A |
| Example 4 | 0 | 20 | — | A | A |
| Example 5 | 20 | 40 | — | A | A |
| Example 6 | 20 | 40 | — | A | A |
| Example 7 | 20 | 40 | — | A | A |
| Example 8 | 50 | 0 | 2 | A | A |

TABLE 1-continued

|  | | | | | |
|---|---|---|---|---|---|
| Example 9 | 15 | 80 | — | A | A |
| Example 10 | 20 | 40 | — | A | A |
| Example 11 | 30 | 35 | — | A | A |
| Comparative example 1 | 20 | 40 | — | D | A |
| Comparative example 2 | 20 | 40 | — | A | D |
| Comparative example 3 | 20 | 40 | — | D | C |
| Comparative example 4 | 20 | 40 | — | D | C |
| Comparative example 5 | 60 | 0 | 0.5 | D | B |
| Comparative example 6 | 20 | 40 | — | D | B |

[1]) the joint reliability was rated A when no separation of the joint portion or no cracking was found after the thermal cycle test end the rate of change in strength was maintained at 90% or higher. rated B when no separation of the joint portion or no cracking was found and the rate of change in strength was 70% to 90%, rated C when no separation of the joint portion or no cracking was found and the rate of change in strength was 70% or less, and rated D when separation or cracking was found,
[2]) The electric resistance was rated A when the rate of change in resistance before and after the thermal cycle test was less than 103%, rated B when the rate of change in resistance was 103% or more and less than 105%, rated C when the rate of change in resistance was 105% or more and less than 200%, and rated D when the rate of change in resistance was 200% or more,

TABLE 2

| Sample [1] | First joint layer (ceramic body side) Ratio of coase partivle to fine particle Mass ratio | Second joint layer (metal member side) Ratio of coase partivle to fine particle Mass ratio | Ceramic body | | Evaluation | |
|---|---|---|---|---|---|---|
|  |  |  | Si content % by mass | Porosity % by volume | Joint reliability [2] | Electric resistance [3] |
| Example 3 | 3/7 | 7/3 | 20 | 40 | A | A |
| Example 12 | 0/10 | 7/3 | 20 | 40 | A | A |
| Example 13 | 3/7 | 10/0 | 20 | 40 | A | A |
| Example 14 | 4/6 | 6/4 | 20 | 40 | A | A |
| Example 15 | 10/0 | 7/3 | 20 | 40 | B | A |
| Example 16 | 3/7 | 0/10 | 20 | 40 | B | A |

1) The same raw material composition as in Example 3.
2) The joint reliability was rated A when no separation of the joint portion or no cracking was found after the thermal cycle test and the rate of change in strength was maintained at 90% or higher, rated B when no separation of the joint portion or no cracking was found and the rate of change in strength was 70% to 90%, rated C when no separation of the joint portion or no cracking was found and the rate of change in strength was 70% or less. and rated D when separation or cracking was found.
3) The electric resistance was rated A when the rate of change in resistance before and after the thermal cycle test was less than 103%. rated B when the rate of change in resistance was 103% or more and less than 105%, rated C when the rate of change in resistance was 105% or more and less than 200%, and rated D when the rate of change in resistance was 200% or more.

(Results and Discussion)

The compositions of the first and second joint layers, the composition of the ceramic body, and the results of the evaluation are summarized in Table 1. As shown in Table 1, in Comparative Example 1, the amount of Cr was large, and the joint reliability after the thermal cycles was not sufficient. This may be because sinterability was low due to the large amount of Cr and therefore the mechanical strength of the joint portion was low. In Comparative Example 2, the amount of Cr was small, and the electric resistance after the thermal cycles was very high. This may be because oxidation resistance was low and the joint portion was oxidized during the thermal cycles. In Comparative Example 3, no compound was added. In Comparative Example 4, the amount of the compound was large. In these cases, the joint reliability and the electric resistance characteristics were low. This may be because, in the joint portion containing no compound, the thermal stress during the thermal cycles could not be relaxed and separation or cracking was likely to occur and because, when the amount of the compound in the joint portion was large, the relative amount of the metal components was small and therefore the joint reliability and the electric resistance characteristics were low. In Comparative Example 5, the ceramic body used was a dense body, and the joint reliability and the electric resistance characteristics were not sufficient. This may be because, since the surface roughness Ra in Comparative Example 5 was small, the anchor effect of the joint portion on the ceramic body was small. In Comparative Example 6, the amount of Ni was large, and the joint reliability and the electric resistance characteristics were not sufficient. This may be because, since the amount of Ni was large, Ni formed reaction phases with SiC and/or Si and the mechanical strength was thereby reduced.

However, in Examples 1 to 11, the joint reliability and the electric resistance characteristics were found to be high. For example, it is conceivable that, when the first joint layer of the joined body contains a larger amount of the low-thermal expansion compound than the second joint layer and the mass ratio of Fe to Cr is within the range of 82/18 to 70/30, the joint reliability and the electric resistance characteristics may be good. It is conceivable that, when the amount of Ni is 8% by mass or less, no reaction phase may be formed and the joint reliability and the electric resistance characteristics may be good. It is conceivable that, when the ceramic body is a dense body and the surface roughness Ra of its joint surface is 2 μm or more, the bondability may be good. It was also found that cordierite and spodumene can be used as the low-thermal expansion compound.

The ratio of the coarse particle to the fine particle in each of the first and second joint layers, the composition of the ceramic body, and the results of the evaluation are summarized in Table 2. As can be seen from Table 2, in the first raw material forming the first joint layer, it is preferable that the volume ratio of the coarse particles to the fine particles is within the range of 0/10 to 6/4. In the second raw material forming the second joint layer, it is preferable that the volume ratio of the coarse particles to the fine particles is within the range of 4/6 to 10/0.

The present application claims priority of Japanese Patent Application No. 2016-058297 filed on Mar. 23, 2016, the entire contents of which are incorporated herein by reference.

What is claimed is:

1. A joined body comprising:
   a silicon carbide-based ceramic body;
   a metal member; and
   a joint portion that joins the ceramic body and the metal member together, the joint portion including a first joint layer and a second joint layer, the first joint layer being disposed on the ceramic body side, the first joint layer containing an alloy that contains Fe and Cr as main components and further containing a compound having a thermal expansion coefficient of $4.0 \times 10^{-6}$ (/° C.) or lower, the compound being dispersed in the first joint layer, the second joint layer being disposed on the metal member side, the second joint layer containing an alloy that contains Fe and Cr as main components, the second joint layer having a larger thermal expansion coefficient than the first joint layer.

2. The joined body according to claim 1,
   wherein, in each of the alloys contained in the joint portion, the mass ratio of Fe to Cr is within a range of 82/18 to 70/30.

3. The joined body according to claim 1,
   wherein each of the alloys contained in the joint portion contains Ni in an amount of from 0% by mass to 8% by mass.

4. The joined body according to claim 1,
   wherein the first joint layer contains the compound in an amount within a range of from 5% by volume to 40% by volume.

5. The joined body according to claim 1,
   wherein the second joint layer contains the compound in an amount within a range of from 0% by volume to 20% by volume.

6. The joined body according to claim 1,
   wherein the compound is at least one of cordierite and spodumene.

7. The joined body according to claim 1,
   wherein the first joint layer of the joint portion has a thickness within a range of from 10 μm to 200 μm.

8. The joined body according to claim 1,
   wherein the second joint layer of the joint portion has a thickness within a range of from 80 μm to 500 μm.

9. The joined body according to claim 1,
   wherein the ceramic body has a volume resistivity of from 0.05 Ωcm to 200 Ωcm, and
   the joint portion has a volume resistivity of from 0.0001 Ωcm to 0.1 Ωcm.

10. The joined body according to claim 1,
    wherein the ceramic body is a honeycomb structure including a partition portion that forms a plurality of cells serving as flow passages of a fluid.

11. A method for producing a joined body including a silicon carbide-based ceramic body, a metal member, and a joint portion that joins the ceramic body and the metal member together and includes a first joint layer and a second joint layer,
    the method comprising:
    a stacking step of forming a first raw material on a ceramic body side, forming a second raw material on a metal member side, and stacking the ceramic body and the metal member one on another to obtain a stacked body, the first raw material becoming the first joint layer, the first raw material containing a compound having a thermal expansion coefficient of $4.0 \times 10^{-6}$ (/° C.) or lower and a metal that contains Fe and Cr as main components, the second raw material becoming the second joint layer that has a larger thermal expansion coefficient than the first joint layer, the second raw material containing a metal that contains Fe and Cr as main components; and
    a heat treatment step of subjecting the stacked body to heat treatment in a vacuum or an inert atmosphere in a temperature range of from 1,000° C. to 1,300° C.

12. The method for producing a joined body according to claim 11,
    wherein, in the stacking step, the mass ratio of Fe to Cr in each of the first raw material used and the second raw material used is within a range of 82/18 to 70/30.

13. The method for producing a joined body according to claim 11,
    wherein, in the stacking step, each of the first raw material used and the second raw material used contains Ni in an amount of from 0% by mass to 8% by mass.

14. The method for producing a joined body according to claim 11,
    wherein, in the stacking step, the first raw material used contains the compound in an amount within a range of from 5% by volume to 40% by volume.

15. The method for producing a joined body according to claim 11,
    wherein, in the stacking step, the second raw material used contains the compound in an amount within a range of from 0% by volume to 20% by volume.

16. The method for producing a joined body according to claim 11,
    wherein, in the stacking step, the compound used is at least one of cordierite and spodumene.

17. The method for producing a joined body according to claim 11,
    wherein, in the stacking step, the first raw material formed has a thickness within a range of from 10 μm to 200 μm.

18. The method for producing a joined body according to claim 11,
    wherein, in the stacking step, the second raw material formed has a thickness within a range of from 80 μm to 500 μm.

19. The method for producing a joined body according to claim 11,
    wherein, in the stacking step, the metal that contains Fe and Cr as main components and is used in the second raw material has a larger average particle diameter than the metal used in the first raw material.

20. The method for producing a joined body according to claim 11, wherein, in the stacking step, the volume ratio of coarse particles to fine particles in the first raw material used is within a range of 0/10 to 6/4, and the volume ratio of coarse particles to fine particles in the second raw material used is within a range of 4/6 to 10/0.

\* \* \* \* \*